United States Patent
Law et al.

(10) Patent No.: US 7,890,763 B1
(45) Date of Patent: Feb. 15, 2011

(54) METHOD OF IDENTIFYING INVALID DIGITAL SIGNATURES INVOLVING BATCH VERIFICATION

(75) Inventors: Laurie E. Law, New Market, MD (US); Brian J. Matt, Riva, MD (US)

(73) Assignees: The United States of America as represented by the Director, National Security Agency, Washington, DC (US); Sparta, Inc., Lake Forest, CA (US)

( * ) Notice: Subject to any disclaimer, the term of this patent is extended or adjusted under 35 U.S.C. 154(b) by 823 days.

(21) Appl. No.: 11/901,109

(22) Filed: Sep. 14, 2007

(51) Int. Cl.
*H04L 9/32* (2006.01)
*H04L 29/06* (2006.01)
*G06Q 20/00* (2006.01)

(52) U.S. Cl. .............. 713/176; 713/157; 713/177; 705/75

(58) Field of Classification Search .......... 713/177
See application file for complete search history.

(56) References Cited

U.S. PATENT DOCUMENTS

| | | | |
|---|---|---|---|
| 4,309,569 A * | 1/1982 | Merkle | 713/177 |
| 4,759,063 A * | 7/1988 | Chaum | 380/30 |
| 4,964,164 A * | 10/1990 | Fiat | 380/30 |
| 5,214,702 A * | 5/1993 | Fischer | 380/30 |
| 5,263,085 A * | 11/1993 | Shamir | 380/30 |
| 5,347,581 A | 9/1994 | Naccache et al. | |
| 5,600,725 A * | 2/1997 | Rueppel et al. | 380/30 |
| 6,910,130 B2 * | 6/2005 | Imai et al. | 713/180 |
| 7,113,594 B2 * | 9/2006 | Boneh et al. | 380/28 |
| 7,245,581 B2 | 7/2007 | Sundaram et al. | |
| 7,337,322 B2 * | 2/2008 | Gentry et al. | 713/176 |
| 7,533,270 B2 * | 5/2009 | Gentry | 713/180 |
| 7,725,724 B2 * | 5/2010 | Ding et al. | 713/176 |
| 7,739,509 B2 * | 6/2010 | Silverbrook et al. | 713/176 |
| 7,814,315 B2 * | 10/2010 | Parkinson | 713/158 |
| 2002/0044648 A1 * | 4/2002 | Arazi | 380/30 |

(Continued)

FOREIGN PATENT DOCUMENTS

JP       2000047582 A  *  2/2000

OTHER PUBLICATIONS

M. Bellare et al.;"Fast Batch Verification for Modular Exponentiation . . . "; Advances in Cryptography-Eurocrypt 98 Proc., LCNS, vol. 1403, pp. 236-250, Springer-Verlag, 1998.

(Continued)

*Primary Examiner*—Christopher A. Revak
*Assistant Examiner*—Carolyn B Kosowski
(74) *Attorney, Agent, or Firm*—Robert D. Morelli

(57) ABSTRACT

Method of identifying invalid digital signatures involving batch verification by receiving digital messages, digital signatures, and signer identifiers, computing $Z_0$ as a function of the received information, and determining if the digital signatures are valid. If so, stopping. If not, assigning a signature identifier to each digital signature, setting w equal to 1, computing $Z_w$ as a function of the received information and signature identifiers, and searching for a multiplicative relationship amongst $Z_0, Z_1, \ldots, Z_w$. If one is found then determining the invalid digital signatures from the multiplicative relationship and stopping. Otherwise, incrementing w and returning to the step of computing for additional processing if desired.

24 Claims, 3 Drawing Sheets

U.S. PATENT DOCUMENTS

| | | | |
|---|---|---|---|
| 2003/0188167 A1* | 10/2003 | Kurosaki et al. | 713/176 |
| 2004/0123110 A1* | 6/2004 | Zhang et al. | 713/176 |
| 2005/0005125 A1 | 1/2005 | Zhang et al. | |
| 2005/0154878 A1* | 7/2005 | Engberg et al. | 713/157 |
| 2005/0154879 A1* | 7/2005 | Engberg et al. | 713/157 |
| 2005/0193048 A1 | 9/2005 | Vaudenay et al. | |
| 2005/0193204 A1* | 9/2005 | Engberg et al. | 713/175 |
| 2007/0028114 A1 | 2/2007 | McCullagh et al. | |
| 2008/0222418 A1* | 9/2008 | Futa et al. | 713/176 |
| 2008/0226066 A1* | 9/2008 | Yi et al. | 380/47 |
| 2008/0320557 A1* | 12/2008 | Hakuta et al. | 726/2 |
| 2009/0112956 A1* | 4/2009 | Cheon | 708/207 |
| 2010/0287378 A1* | 11/2010 | Goldman et al. | 713/176 |

OTHER PUBLICATIONS

J. Pastuszak et al.; "Identification of Bad Signatures in Batches", Public Key Cryptography-PKC 2000, LCNS 1751, pp. 28-45, Springer-Verlag, 2000.

J. Cha et al.; "An Identity-Based Signature from Gap Diffie-Hellman Groups", Public Key Cryptography-PKC 2003, LCNS, vol. 2567, pp. 18-30, Springer-Verlag, 2003.

J. Cheon et al. "A New ID-based Signature with Batch Verification", Cryptology ePrint Archive, Report 2004/131, 2004, http://eprint.iacr.org/.

\* cited by examiner

METHOD OF IDENTIFYING INVALID DIGITAL SIGNATURES INVOLVING BATCH VERIFICATION

CREATE ACT STATEMENT

The present invention resulted from a joint research agreement between the National Security Agency and SPARTA, Incorporated. The date of the agreement is Oct. 29, 2004. The field of invention is as identified above.

FIELD OF INVENTION

The present invention relates, in general, to electrical computers and digital processing systems support and, in particular, to multiple computer communication using cryptography for authentication by digital signature or digital watermark.

BACKGROUND OF THE INVENTION

Public key cryptography is used to generate and verify the validity of digital signatures. A digital signature algorithm requires a private key, which is known only by the signer, and a public key, which can be made available to anyone that may need to verify the signature. A digital message is signed using the signer's private key, and a digital signature's validity is verified using the signer's public key. A valid digital signature authenticates the identity of the signer and the integrity of the digital message. If the digital signature fails the verification test then the digital signature is considered invalid. An invalid signature does not provide any assurance to the verifier of the identity of the signer or the integrity of the message. An invalid signature may be the result of an intentional modification or substitution of the digital message or digital signature, or may be the result of an unintentional modification, such as a transmission error.

Testing each digital signature in a large group (i.e., a batch) of digital signatures individually for validity may be too time consuming for many applications. It is often possible to test the validity of digital signatures as a batch. Batch verification can be much less time intensive than individual verification of digital signatures. If all of the digital signatures in a batch are valid, then the batch is valid and will pass the batch verification test. If at least one digital signature in the batch is invalid, then the batch is invalid and will fail the verification test. If a batch is invalid and one wants to know which digital signatures within the batch are invalid then at least some further verification testing is required. Present methods of identifying invalid digital signatures in large batches may be too time consuming for many applications. Therefore, there is a need for a time efficient method of identifying invalid digital signatures in batches. The present invention is such a method.

Three methods of verifying a batch of digital signatures is disclosed in a paper by Mihir Bellare et al, entitled "Fast Batch Verification for Modular Exponentiation and Digital Signatures," *Advances in Cryptography—Eurocrypt 98 Proceedings,* LCNS, Vol. 1403, pp. 236-250, Springer-Verlag, 1998. One of these methods is known as the "small exponents test." The first step of the method is receiving a number of digital messages, digital signatures, and signer identifiers, where the digital signatures were generated using a generator g. The second step of the method is computing first and second numeric values corresponding to the digital messages, digitals signatures, and signer identifiers. The third step of the method is selecting a number of random numbers equal to the number of digital signatures. The fourth step of the method is associating each random number with a digital signature. The fifth step of the method is multiplying each first numeric value by its corresponding random number. The sixth step of the method is summing the products of the fifth step. The seventh step of the method is raising each second numeric value to a power, where the power is the corresponding random number. The eighth step of the method is multiplying the results of the seventh step. The ninth step of the method is raising g to the result of the sixth step. The tenth step of the method is comparing the results of the eighth and ninth steps. If the results are equal then the batch is valid and all of the digital signatures therein are valid. Otherwise, the batch is invalid and at least one digital signature therein is invalid.

If a batch of digital signatures is invalid then it is often necessary to identify the invalid digital signatures that caused the batch to fail. The naïve method is to perform an individual verification test on each digital signature in the batch. This requires as many verification tests as there are digital signatures in the batch, which may be too time consuming for many applications that require large numbers of digital signatures.

Divide-and conquer approaches (also know as "cut-and-choose" approaches) that reduce the number of verifications tests required to identify invalid digital signatures in an invalid batch are disclosed in a paper by J. Pastuszak et al., entitled "Identification of Bad Signatures in Batches," *Public Key Cryptography—PKC* 2000, LCNS 1751, pp. 28-45, Springer-Verlag, 2000. That is, a verification test is performed on the original batch. If the batch is valid then stop. Otherwise, divide the batch into smaller batches. Then, perform a verification test on each smaller batch, eliminating the smaller batches that are valid, and further dividing the smaller batches that were invalid. Eventually, this technique will lead to the individual digital signatures that caused the original batch to fail the verification test. If each batch to be divided is halved, the divide-and-conquer approach becomes a binary search. In most cases, divide-and-conquer methods identify invalid digital signature more quickly than the naïve method. However, in some applications, identifying invalid signatures is still too time consuming. Therefore, a faster method of identifying invalid signatures is needed. The present invention is such a method.

Some prior art digital signature methods are based on bilinear pairings, because the mathematical properties of such pairings can be used to generate digital signatures that are either shorter or facilitate the identification of the signer. Digital signatures that employ bilinear pairings are commonly referred to as pairing-based digital signatures. Digital signatures that facilitate the identification of the sender are commonly referred to as identity-based digital signatures. Identity-based digital signatures are public key digital signatures in which the verifier can compute the signer's public key directly from the signer's identifier. This eliminates the need to generate and manage digital certificates, which bind signer's identifiers to their public keys. It also eliminates the need to transmit a public key or a digital certificate. However, verification of identity-based digital signatures often involves bilinear-pairing operations, which are more computationally intensive than other operations. Verifying a large batch of identity-based digital signatures is often prohibitive using prior art methods, including divide-and-conquer methods. Therefore, there is a need for a batch verification method for identity-based digital signatures that requires fewer computations. The present invention is such a method.

In an article entitled "An Identity-Based Signature from Gap Diffie-Hellman Groups," by J. Cha and J. Cheon, *Public Key Cryptography—PKC* 2003, LCNS, Vol. 2567, pp. 18-30, Springer-Verlag, 2003, an identity-based digital signature method that employs bilinear pairings is disclosed. The method can be described as follows. $G_1$ and $G_2$ are groups which have prime order r, meaning that there are exactly r elements in each group. The bilinear pairing e is a map from $G_1 \times G_2$ into a third group $G_3$. This pairing has the properties that for an integer i and elements $M, M_1$ and $M_2$ in $G_1$ and elements $N$, $N_1$ and $N_2$ in $G_2$, $e(iM,N)=e(M,iN)=e(M,N)^i$, $e(M_1+M_2,N)=e(M_1,N)+e(M_2,N)$, and $e(M,N_1+N_2)=e(M,N_1)e(M,N_2)$. $H(m,U)$ is a cryptographic hash function that maps a bit string m and a point U in $G_1$ to an integer between 1 and r.

The first step of the Cha-Cheon method is selecting an element T in $G_2$. Then, selecting an integer s in the range [1, r−1] and keeping it as a secret. Then, computing P equal to sT. Then, P and T are made public. Then, a user is given a public key Q and a private key C, where Q is an element of $G_1$ that is derived from the user's identifier, and where C is equal to sQ. To sign a message m, a signer selects an integer t in the range [1, r−1]. Then, the signer generates U equal to tQ and generates V equal to $(t+H(m,U))C$. The digital signature is (U,V).

To verify a digital signature (U,V) generated by the Cha-Cheon method using a message m, a verifier derives the signer's public key Q from the signer's identifier and computes h equal to $H(m,U)$. If $e(U+hQ,P)$ is equal to $e(V,T)$ then the digital signature is valid and the message is accepted as being as the sender intended. Otherwise, the digital signature is invalid, and the message is not accepted.

In an article entitled "A New ID-Based Signature with Batch Verification," by J. Cheon et al., *Cryptology ePrint Archive*, Report 2004/131, 2004, http://eprint.iacr.org/, a batch verification method for an identity-based digital signature is disclosed. This method uses partially aggregate digital signatures, which are shorter than those in a typical batch of digital signatures. However, using such digital signatures does not provide sufficient information to identify individual invalid digital signatures in a batch.

U.S. Pat. No. 5,347,581, entitled "VERIFICATION PROCESS FOR A COMMUNICATION SYSTEM," discloses a method of batch verification of digital signatures and tree searching for invalid digital signatures. However, U.S. Pat. No. 5,347,581 does not disclose an efficient method for pruning the tree as does the present invention. U.S. Pat. No. 5,347,581 is hereby incorporated by reference into the specification of the present invention.

U.S. Pat. No. 7,245,718, entitled "LOW BANDWIDTH ZERO KNOWLEDGE AUTHENTICATION PROTOCOL AND DEVICE," discloses a method of verifying a batch of identities by calculating a product of the public keys of the identities in question. However, U.S. Pat No. 7,245,718 does not disclose a method for identifying invalid signatures in an invalid batches as does the present invention. U.S. Pat. No. 7,245,718 is hereby incorporated by reference into the specification of the present invention.

U.S. patent application No. 20050005125, entitled "APPARATUS AND METHOD FOR GENERATING AND VERIFYING ID-BASED BLIND SIGNATURE BY USING BILINEAR PAIRINGS," discloses a device for and method of batch verification of digital signatures using a process similar to that of U.S. Pat. 5,347,581. U.S. patent application No. 20050005125 does not disclose a method of identifying invalid digital signatures in invalid batches as does the present invention. U.S. patent application No. 20050005125 is hereby incorporated by reference into the specification of the present invention.

U.S. patent application No. 20050193048, entitled "METHOD TO GENERATE, VERIFY AND DENY AN UNDENIABLE SIGNATURE," discloses a method of batch verification involving a challenge parameter, a challenge value generated from the challenge parameters, and a commitment value. The present invention does not employ challenge parameters, a challenge value, and a commitment value as does U.S. patent application No. 20050193048. U.S. patent application No. 20050193048 is hereby incorporated by reference into the specification of the present invention.

U.S. patent application No. 20070028114, entitled "VERIFICATION OF IDENTITY BASED SIGNATURES," discloses a method of batch verification of digital signatures by aggregating elements of the signatures. U.S. patent application No. 20070028114 does not disclose a method of identifying invalid digital signatures in invalid batches as does the present invention. U.S. patent application No. 20070028114 is hereby incorporated by reference into the specification of the present invention.

SUMMARY OF THE INVENTION

It is an object of the present invention to efficiently identify invalid digital signatures involving batch verification.

It is an object of the present invention to efficiently identify invalid digital signatures involving batch verification and identity-based digital signatures.

The first step of the preferred method is receiving corresponding digital messages, digital signatures, and signer identifiers.

The second step of the method is computing a value $Z_0$ as a function of the digital messages, the digital signatures, and signer identifiers, where $Z_0$ is an element of a group, and where the group has an identity element.

The third step of the method is determining if the digital signatures, as a batch, are valid for their corresponding digital messages and signer identifiers.

If the digital signatures, as a batch, are valid then the fourth step of the method is then stopping.

The fifth step of the method is assigning a user-definable signature identifier to each digital signature.

The sixth step of the method is setting w equal to 1.

The seventh step of the method is computing $Z_w$ as a function of the digital messages, digital signatures, signer identifiers, and signature identifiers.

The eighth step of the method is searching for a multiplicative relationship amongst $Z_0, Z_1, \ldots Z_w$.

If a multiplicative relationship is found in the eighth step then the ninth step of the method is determining the invalid digital signatures from the multiplicative relationship and stopping. Otherwise, incrementing w and returning to the seventh step for additional processing if desired.

In an alternate embodiment, invalid sub-batches of batches of digital signatures are identified.

In a second alternate method, the invalid digital signatures are identified using a "divide-and-conquer" method with fewer verifications than in the prior art.

DETAILED DESCRIPTION

The present invention is a method of identifying invalid digital signatures involving batch verification that requires fewer steps than does the prior art.

This efficient identification of invalid signatures is facilitated by changing the form of the batch verification test. Prior art verification and batch verification tests typically compute two values, X and Y, and compare them for equality. If they are equal, then the verification test passes and the batch determined to be valid. If X is not equal to Y, then the batch is determined to be invalid. The present invention performs verification by computing a value Z, where Z is the product of X and the inverse of Y, and comparing Z to the identity element. If Z is equivalent to the identity element, then the verification test passes and the batch determined to be valid. If Z is not equivalent to the identity element, then the batch is invalid. This new test takes no longer than the prior art test, but results in the computation of a new value, Z, that can be compared to other computed values to identify the invalid signatures with fewer operations than prior art methods.

Figure 1:
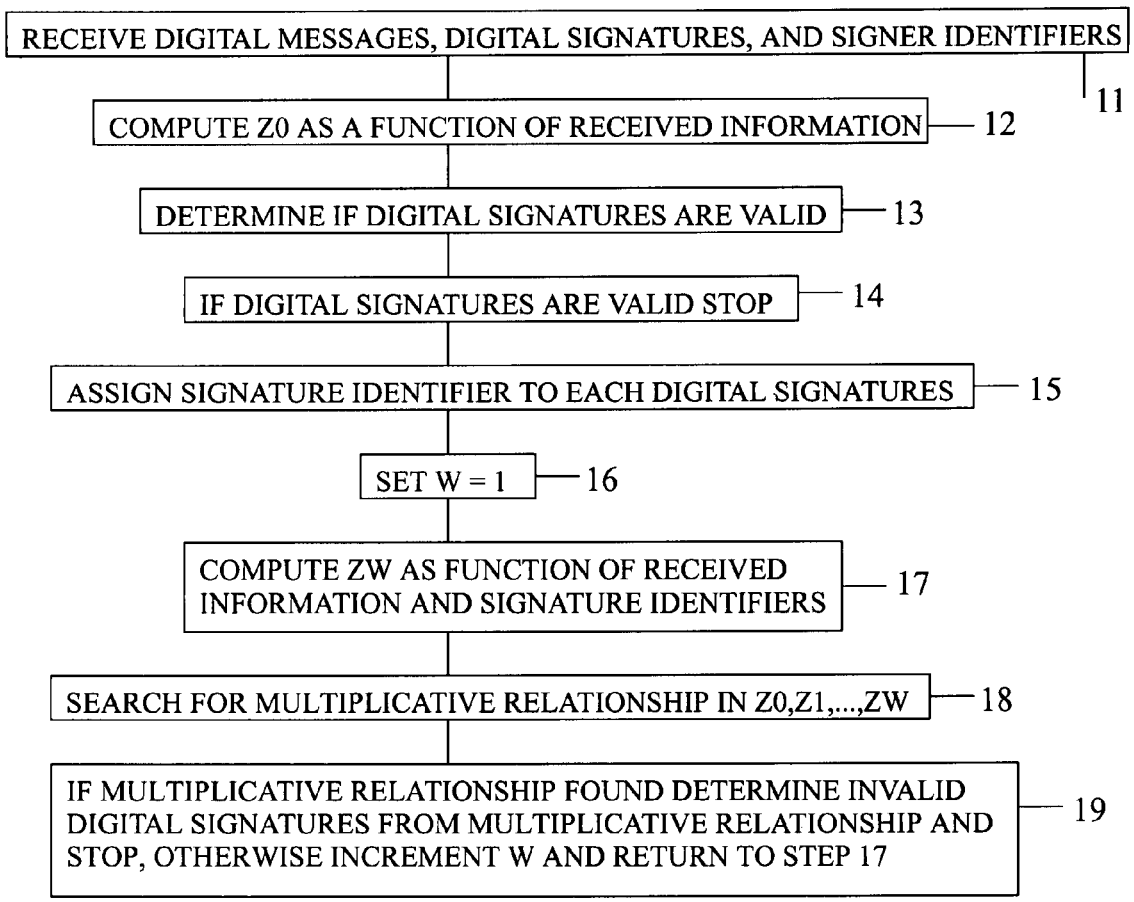
FIG. 1 is a flowchart of the preferred embodiment of the present invention.

FIG. 1 is a flow-chart of the preferred embodiment of the present invention. The preferred embodiment of the present invention can often find invalid pairing-based digital signatures faster than prior art methods because it uses fewer verification tests, and therefore fewer computationally intensive bilinear pairing computations are performed.

The first step 11 of the preferred method is receiving a plurality of corresponding digital messages, digital signatures, and signer identifiers. The digital messages, digital signatures, and signer identifiers are received in any appropriate digital signature format. For example, the digital messages, digital signatures, and signer identifiers may be received in a form appropriate for a pairing-based digital signature.

The second step 12 of the preferred method is computing a value $Z_0$ as a function of the digital messages, the digital signatures, and signer identifiers. $Z_0$ is an element of a group, and where the group has an identity element. For a pairing-based digital signature $Z_0$ is computed as follows:

$$Z_0 = e\left(\sum_{k=1}^{N} B_k, P\right) e\left(\sum_{k=1}^{N} D_k, R\right).$$

N is equal to the number of digital signatures. $B_k$ is equal to $r_k G_k$, where $r_k$ is a user-definable random value. $D_k$ is equal to $r_k H_k$, where $G_k$ and $H_k$ are values from a second group. R and P are values from a third group. In the preferred embodiment, digital signatures, as a batch, are valid if $Z_0$ is congruent to the identity element. In pairing-based digital signatures as described above, the identity element is 1.

The third step 13 of the preferred method is determining if the digital signatures, as a batch, are valid for their corresponding digital messages and signer identifiers.

The fourth step 14 of the preferred method is stopping if the digital signatures, as a batch, are valid.

The fifth step 15 of the preferred method is assigning a user-definable signature identifier to each digital signature. In the preferred embodiment, a user-definable unique signature identifier is assigned to each digital signature.

The sixth step 16 of the preferred method is setting w equal to 1.

The seventh step 17 of the preferred method is computing $Z_w$ as a function of the digital messages, digital signatures, signer identifiers, and signature identifiers. For some pairing-based digital signatures $Z_w$ is computed as follows:

$$Z_w = e\left(\sum_{k=1}^{N} (I_k)^w B_k, P\right) e\left(\sum_{k=1}^{N} (I_k)^w D_k, R\right).$$

N is equal to the number of digital signatures. $I_k$ is the signature identifier for the kth signature. $B_k$ is equal to $r_k G_k$, where $r_k$ is a user-definable random value. $D_k$ is equal to $r_k H_k$, where $G_k$ and $H_k$ are values from a second group. R and P are values from a third group.

The eighth step 18 of the preferred method is searching for a multiplicative relationship amongst $Z_0, Z_1, \ldots, Z_w$. For some pairing-based digital signatures, searching for a multiplicative relationship amongst $Z_0, Z_1, \ldots, Z_w$ is searching for the following multiplicative relationship:

$$Z_w = \prod_{t=1}^{w} (Z_{w-t})^{(-1)^{t-1} p_t},$$

where $p_t$ is a $t^{th}$ elementary symmetric polynomial in $x_1, x_2, \ldots, x_w$, and where $x_1, x_2, \ldots, x_w$ identify the signature identifiers and, in turn, identify the invalid digital signatures.

The ninth step 19 of the preferred method is determining the invalid digital signatures from the multiplicative relationship and stopping if a multiplicative relationship is found in the eighth step 18. Otherwise, incrementing w and returning to the seventh step 17 for additional processing if desired.

The preferred method can be applied to several pairing-based digital signatures, including the Cha-Cheon pairing-based digital signature method described earlier. When the preferred method is applied to the Cha-Cheon method, $B_k = r_k (U_k + H(m_k, U_k) \cdot Q_k)$, $D_k = V_k$ and $R = -T$.

Figure 2:
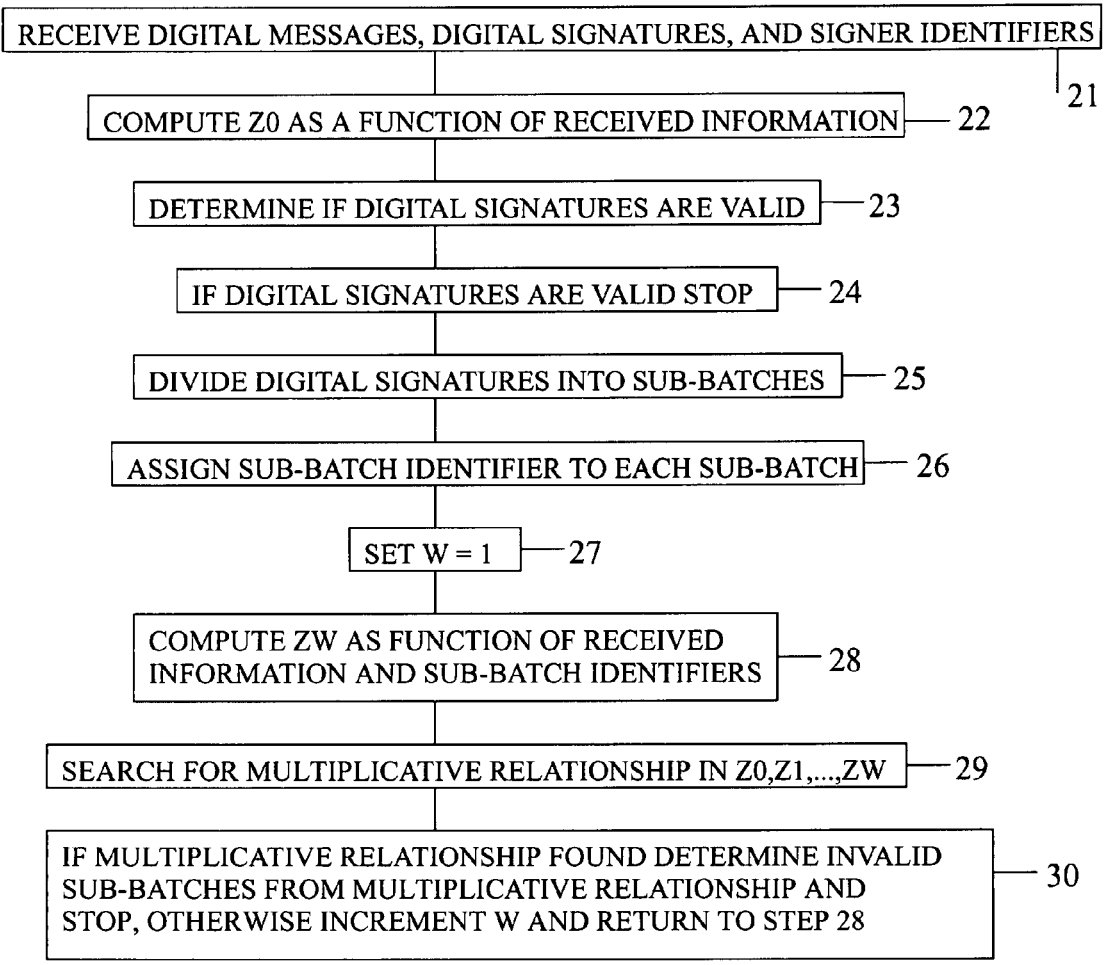
FIG. 2 is a flowchart of the first alternate embodiment of the present invention.

FIG. 2 is a flow-chart of a first alternate embodiment of the present invention. The first alternate embodiment is a method of identifying invalid sub-batches of a larger batch of digital signatures, rather than identifying the invalid digital signatures. An invalid sub-batch is one that contains at least one invalid digital signature. Once an invalid sub-batch is identified then additional steps can be used to identify the invalid digital signatures contained therein.

The first step 21 of the first alternative method of the present invention in FIG. 2 is receiving a plurality of corresponding digital messages, digital signatures, and signer identifiers. The digital messages, digital signatures, and signer identifiers are received in any form appropriate for a digital signature. For example, the first alternative embodiment may receive a pairing-based digital signature.

The second step 22 of the first alternative method is computing a value $Z_0$ as a function of the digital messages, the digital signatures, and signer identifiers. $Z_0$ is an element of a group, and the group has an identity element. For some pairing-based digital signatures, $Z_0$ is computed as follows:

$$Z_0 = e\left(\sum_{k=1}^{N} B_k, P\right) e\left(\sum_{k=1}^{N} D_k, R\right).$$

N is equal to the number of digital signatures. $B_k$ is equal to $r_k G_k$, where $r_k$ is a user-definable random value. $D_k$ is equal to $r_k H_k$, where $G_k$ and $H_k$ are values from a second group. R and P are values from a third group.

The third step 23 of the first alternative method is determining if the digital signatures, as a batch, are valid for their corresponding digital messages and signer identifiers. In the preferred first alternative embodiment, digital signatures, as a batch, are determined to be valid if $Z_0$ is equivalent to the identity element. In pairing-based digital signatures as described above, the identity element is 1.

The fourth step 24 of the first alternative method is stopping if the digital signatures, as a batch, are valid.

The fifth step 25 of the first alternative method is dividing the received digital signatures into user-definable sub-batches of digital signatures.

The sixth step 26 of the first alternative method is assigning a sub-batch identifier to each sub-batch.

The seventh step 27 of the first alternative method is setting w equal to 1.

The eighth step 28 of the first alternative method is computing $Z_w$ as a function of the digital messages, digital signatures, signer identifiers, and sub-batch identifiers. For a pairing-based digital signature, $Z_w$ is computed as follows:

$$Z_w = e\left(\sum_{k=1}^{N} (I_k)^w B_k, P\right) e\left(\sum_{k=1}^{N} (I_k)^w D_k, R\right).$$

N is equal to the number of digital signatures. $I_k$ is the sub-batch identifier for the sub-batch containing the kth signature. $B_k$ is equal to $r_k G_k$, where $r_k$ is a user-definable random value. $D_k$ is equal to $r_k H_k$, where $G_k$ and $H_k$ are values from a second group. R and P are values from a third group.

The ninth step 29 of the first alternative method is searching for a multiplicative relationship amongst $Z_0, Z_1, \ldots, Z_w$. For a pairing-based digital signature, the following multiplicative relationship is searched for:

$$Z_w = \prod_{t=1}^{w} (Z_{w-t})^{(-1)^{t-1} p_t},$$

where $p_t$ is a $t^{th}$ elementary symmetric polynomial in $x_1$, $x_2, \ldots, x_w$, and where $x_1, x_2, \ldots, x_w$ identify the sub-batch identifiers and, in turn, identify the invalid sub-batches of digital signatures.

The tenth step 30 of the first alternative method is determining the invalid sub-batches and stopping if the multiplicative relationship is found in the ninth step 29. Otherwise, incrementing w and returning to the eighth step 28 for additional processing if desired.

To identify invalid signatures in invalid sub-batches identified using the first alternative method, the following steps are performed. Setting N equal to the total number of digital signatures in all of the invalid sub-batches. Setting $Y_0$ equal to $Z_0$. Setting w equal to the number of invalid sub-batches identified using the first alternative method. Assigning a unique user-definable signature identifier $I_k$ to each kth digital signature in the invalid sub-batches. Computing values $Y_i$, for each value i from 1 to w−1, as a function of the digital messages, digital signatures, signer identifiers, and signature identifiers in the invalid sub-batches. Computing a value $Y_w$ as a function of the digital messages, digital signatures, signer identifiers, and signature identifiers in the invalid sub-batches. Searching for a multiplicative relationship amongst $Y_0, Y_1, \ldots, Y_w$. Determining the invalid signatures from the multiplicative relationship and stopping if a multiplicative relationship is found in the last step. Otherwise, incrementing w and returning to step of computing $Y_w$ for additional processing if desired.

The steps of computing values $Y_i$, for each value i from 1 to w, are computed as follows for some pairing-based digital signatures:

$$Y_i = e\left(\sum_{k=1}^{N} (I_k)^i B_k, P\right) e\left(\sum_{k=1}^{N} (I_k)^i D_k, R\right).$$

N is equal to the number of digital signatures in the invalid sub-batches. $I_k$ is the signature identifier for the kth signature. $B_k$ is equal to $r_k G_k$, where $r_k$ is a user-definable random value. $D_k$ is equal to $r_k H_k$, where $G_k$ and $H_k$ are values from a second group. R and P are values from a third group.

The step of searching for a multiplicative relationship amongst $Y_0, Y_1, \ldots, Y_w$ for some pairing-based digital signatures is comprised of searching for the following multiplicative relationship:

$$Y_w = \prod_{t=1}^{w} (Y_{w-t})^{(-1)^{t-1} p_t},$$

where $p_t$ is a $t^{th}$ elementary symmetric polynomial in $x_1$, $x_2, \ldots, x_w$, and where $x_1, x_2, \ldots, x_w$ identify the signature identifiers and, in turn, identify the invalid digital signatures.

The first alternative method can be applied to several pairing-based digital signatures, including the Cha-Cheon pairing-based digital signature method described earlier. When the first alternative method is applied to the Cha-Cheon method, $B_k = r_k(U_k + H(m_k, U_k) \cdot Q_k)$, $D_k = V_k$ and $R = -T$.

Figure 3:
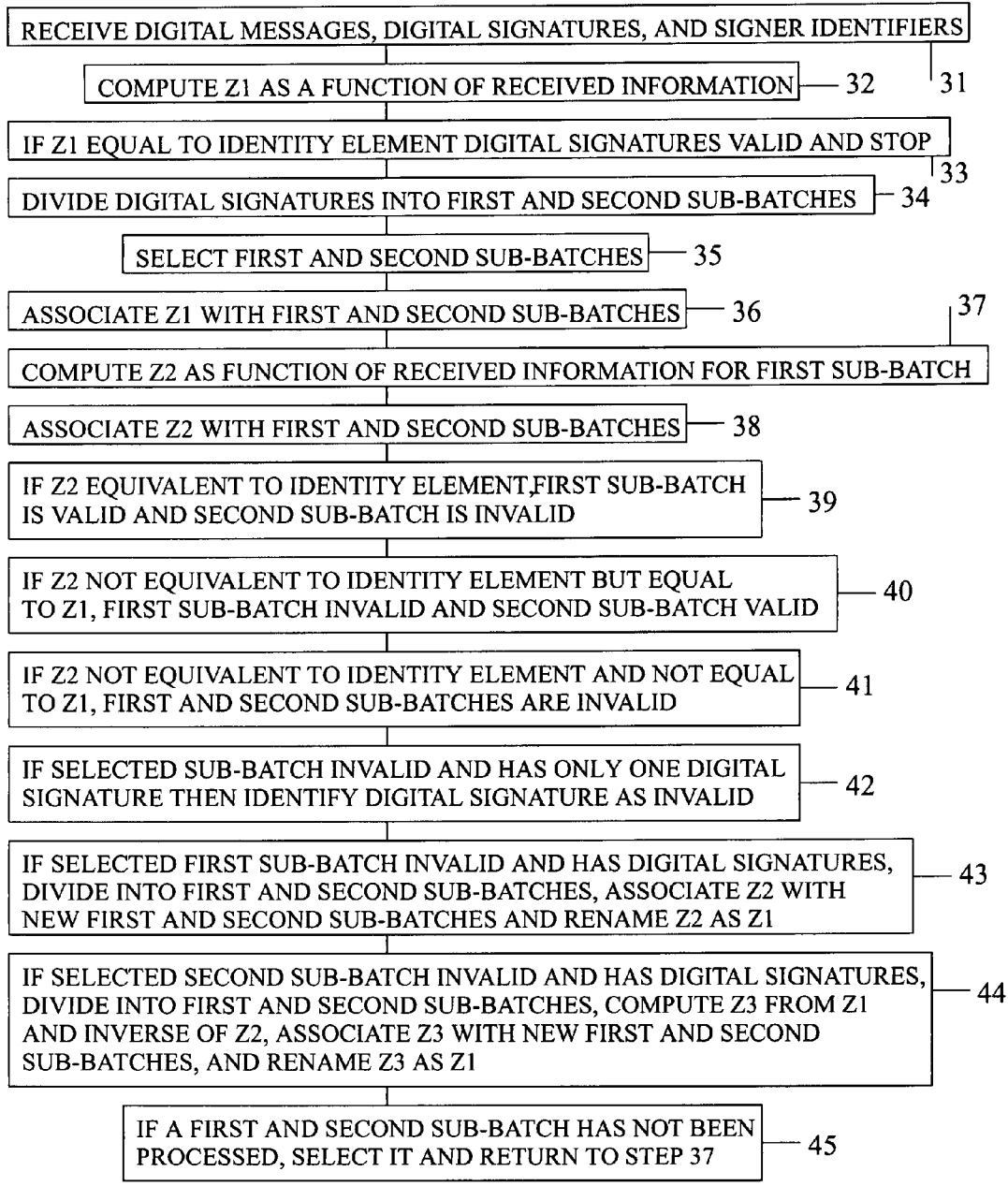
FIG. 3 is a flowchart of the second alternate embodiment of the present invention.

FIG. 3 is a second alternative embodiment of the present invention. The second alternative embodiment is a "divide-and-conquer" method of identifying invalid digital signatures involving batch verification. It uses the Z value computed during batch verification to eliminate some of the verifications required by "divide-and-conquer" methods in the prior art, resulting in a faster method.

The first step 31 of the second alternative method is receiving a plurality of corresponding digital messages, digital signatures, and signer identifiers. In the preferred second alternative method, the corresponding digital messages, digital signatures, and signer identifiers are received in a form appropriate for any digital signature format (e.g., pairing-based digital signature format, an elliptic curve-based digital signature format, and a digital signature format that employs finite field arithmetic).

The second step 32 of the second alternative method is computing a value $Z_1$ as a function of the received digital messages, digital signatures, and signer identifiers. $Z_1$ is an element of a group, and the group has an identity element.

The third step 33 of the second alternative method is determining that the digital signatures, as a batch, are valid and stopping if $Z_1$ is equivalent to the identity element. In most cases, the identity element is 1.

The fourth step 34 of the second alternative method is dividing the digital signatures into a first sub-batch and a second sub-batch.

The fifth step 35 of the second alternative method is selecting the first and second sub-batches.

The sixth step 36 of the second alternative method is associating $Z_1$ with the selected first and second sub-batches.

The seventh step 37 of the second alternative method is computing a value $Z_2$ as a function of the digital messages, digital signatures, and signer identifiers in the first selected sub-batch.

The eighth step 38 of the second alternative method is associating $Z_2$ with the selected first and second sub-batches. $Z_2$ is an element of the same group as $Z_1$.

The ninth step 39 of the second alternative method is determining that the selected first sub-batch is valid and the selected second sub-batch is invalid if $Z_2$ is equivalent to the identity element of the corresponding group.

The tenth step 40 of the second alternative method is determining that the selected first sub-batch is invalid and the selected second sub-batch is valid if $Z_2$ is not equivalent to the identity element of the corresponding group but is equal to $Z_1$ associated with the selected first and second sub-batches.

The eleventh step 41 of the second alternative method is determining that the selected first and second sub-batches are invalid if $Z_2$ is not equivalent to the identity element of the corresponding group and is not equivalent to $Z_1$ associated with the selected first and second sub-batches.

The twelfth step 42 of the second alternative method is identifying the digital signature as invalid if a selected sub-batch is determined to be invalid and the selected sub-batch contains only one digital signature.

The thirteenth step 43 of the second alternative method is dividing the selected first sub-batch into a first sub-batch of digital messages, digital signatures, and signer identifiers and an associated second sub-batch of digital messages, digital signatures, and signer identifiers; associating the newly formed first and second sub-batches with $Z_2$; and renaming $Z_2$ as $Z_1$ if the selected first sub-batch is determined to be invalid and contains more than one digital signature.

The fourteenth step 44 of the second alternative method is dividing the selected second sub-batch into a first sub-batch of digital messages, digital signatures, and signer identifiers and a second sub-batch of digital messages, digital signatures, and signer identifiers; computing a value $Z_3$ as the product of $Z_1$ and the inverse of $Z_2$; associating the newly formed first and second sub-batches with $Z_3$; and renaming $Z_3$ as $Z_1$ if the selected second selected sub-batch is determined to be invalid and contains more than one digital signature.

The fifteenth step 45 of the second alternative method is selecting one of such first and second sub-batches, and returning to the seventh step 37 if there is at least one pair of associated first and second sub-batches that have not been selected.

What is claimed is:

1. A method of identifying invalid digital signatures involving batch verification, comprising the steps of:
   a) receiving on an electrical computer a plurality of corresponding digital messages, digital signatures, and signer identifiers;
   b) computing on the electrical computer a value $Z_0$ as a function of the digital messages, the digital signatures, and the signer identifiers, where $Z_0$ is an element of a group, and where the group has an identity element;
   c) determining on the electrical computer if the digital signatures, as a batch, are valid for their corresponding digital messages and signer identifiers;
   d) if the digital signatures, as a batch, are valid then stopping, otherwise proceeding to step (e);
   e) assigning on the electrical computer a user-definable signature identifier to each digital signature;
   f) setting on the electrical computer w equal to 1;
   g) computing on the electrical computer $Z_w$ as a function of the digital messages, the digital signatures, the signer identifiers, and the signature identifiers;
   h) searching on the electrical computer for a multiplicative relationship amongst $Z_0, Z_1, \ldots, Z_w$; and
   i) if a multiplicative relationship is found in step (h) then determining on the electrical computer the invalid digital signatures from the multiplicative relationship and stopping, otherwise incrementing w and returning to step (g) for additional processing.

2. The method of claim 1, wherein the step of receiving a plurality of corresponding digital messages, digital signatures, and signer identifiers is comprised of the step of receiving a plurality of corresponding digital messages, digital signatures, and signer identifiers in a form appropriate for a pairing-based digital signature, 3. The method of claim 2, wherein the step of computing $Z_0$ as a function of the digital messages, the digital signatures, and the signer identifiers in a form appropriate for a pairing-based digital signature is comprised of the step of computing $$Z_0 = e\left(\sum_{k=1}^{N} B_k, P\right) e\left(\sum_{k=1}^{N} D_k, R\right),$$

where N is equal to the number of digital signatures, where $B_k = r_k G_k$, where $r_k$ is a user-definable random value, where $D_k = r_k H_k$, where $G_k$ and $H_k$ are values from a second group, where R and P are values from a third group.

4. The method of claim 1, wherein the step of determining if the digital signatures, as a batch, are valid is comprised of the step of determining if $Z_0$ is equivalent to the identity element.

5. The method of claim 4, wherein the step of determining if $Z_0$ is equivalent to the identity element is comprised of the step of determining if $Z_0$ is congruent to 1.

6. The method of claim 1, wherein the step of assigning a user-definable signature identifier to each digital signature is comprised of the step of assigning a user-definable unique signature identifier to each digital signature.

7. The method of claim 2, wherein the step of computing $Z_w$ as a function of the digital messages, the digital signatures, the signer identifiers, and the signature identifiers is comprised of the step of computing $Z_w$ as a function of the digital messages, the digital signatures, the signer identifiers, and the signature identifiers in a form appropriate for a pairing-based digital signature, where $$Z_w = e\left(\sum_{k=1}^{N} (I_k)^w B_k, P\right) e\left(\sum_{k=1}^{N} (I_k)^w D_k, R\right),$$

where N is equal to the number of digital signatures, where $I_k$ is the signature identifier for the kth signature, where $B_k = r_k G_k$, where $r_k$ is a user-definable random value, where $D_k = r_k H_k$, where $G_k$ and $H_k$ are values from a second group, where R and P are values from a third group.

8. The method of claim 2, wherein the step of searching for a multiplicative relationship amongst $Z_0, Z_1, \ldots, Z_w$ is comprised of the step of searching for a multiplicative relationship concerning a pairing-based digital signature amongst $Z_0, Z_1, \ldots, Z_w$, where the multiplicative relationship is $$Z_w = \prod_{t=1}^{w} (Z_{w-t})^{(-1)^{t-1} p_t},$$

where $p_t$ is a $t^{th}$ elementary symmetric polynomial in $x_1, x_2, \ldots, x_w$, and where $x_1, w_2, \ldots, x_w$ identify the signature identifiers and, in turn, identify the invalid digital signatures.

9. A method of identifying invalid sub-batches of digital signatures, where each invalid sub-batch contains at least one invalid digital signature, comprising the steps of:

a) receiving on an electrical computer a plurality of corresponding digital messages, digital signatures, and signer identifiers;
b) computing on the electrical computer a value $Z_0$ as a function of the digital messages, the digital signatures, and signer the signer identifiers, where $Z_0$ is an element of a group, and where the group has an identity element;
c) determining on the electrical computer if the digital signatures, as a batch, are valid for their corresponding digital messages and signer identifiers;
d) if the digital signatures, as a batch, are valid, then stopping, otherwise proceeding to the next step;
e) dividing on the electrical computer the received digital signatures into a plurality of user-definable sub-batches of digital signatures;
f) assigning on the electrical computer a sub-batch identifier to each sub-batch;
g) setting on the electrical computer w equal to 1;
h) computing on the electrical computer $Z_w$ as a function of the digital messages, the digital signatures, the signer identifiers, and the sub-batch identifiers;
i) searching on the electrical computer for a multiplicative relationship amongst $Z_0, Z_1, \ldots, Z_w$; and
j) if the multiplicative relationship is found in step (h) then determining on the electrical computer the invalid sub-batches and stopping, otherwise incrementing w and returning to step (h) for additional processing.

10. The method of claim 9, wherein the step of receiving a plurality of corresponding digital messages, digital signatures, and signer identifiers is comprised of the step of receiving a plurality of corresponding digital messages, digital signatures, and signer identifiers in a form appropriate for a pairing-based digital signature.

11. The method of claim 10, wherein the step of computing $Z_0$ as a function of the digital messages, the digital signatures, and the signer identifiers in a form appropriate for a pairing-based digital signature is comprised of the step of computing $$Z_0 = e\left(\sum_{k=1}^{N} B_k, P\right) e\left(\sum_{k=1}^{N} D_k, R\right),$$

where N is equal to the number of digital signatures, where $B_k = r_k G_k$, where $r_k$ is a user-definable random value, where $D_k = r_k H_k$, where $G_k$ and $E_k$ are values from a second group, where R and P are values from a third group.

12. The method of claim 9, wherein the step of determining if the digital signatures, as a batch, are valid is comprised of the step of determining if $Z_0$ is equivalent to the identity element.

13. The method of claim 12, wherein the step of determining if $Z_0$ is equivalent to the identity element is comprised of the step of determining if $Z_0$ is congruent to 1.

14. The method of claim 10, wherein the step of computing $Z_w$ as a function of the digital messages, the digital signatures, the signer identifiers, and the sub-batch identifiers is comprised of the step of computing $Z_w$ as a function of the digital messages, the digital signatures, the signer identifiers, and the sub-batch identifiers in a form appropriate for a pairing-based digital signature, where $$Z_w = e\left(\sum_{k=1}^{N} (I_k)^w B_k, P\right) e\left(\sum_{k=1}^{N} (I_k)^w D_k, R\right),$$

where N is equal to the number of digital signatures, where $I_k$ is the sub-batch identifier for the kth signature, where $B_k = r_k G_k$, where $r_k$ is a user-definable random value, where $D_k = r_k H_k$, where $G_k$ and $H_k$ are values from a second group, where R and P are values from a third group.

15. The method of claim 10, wherein the step of searching for a multiplicative relationship amongst $Z_1, Z_1, \ldots, Z_w$, is comprised of the step of searching for a multiplicative relationship concerning a pairing-based digital signature amongst $Z_0, Z_1, \ldots, Z_w$, where the multiplicative relationship is $$Z_w = \prod_{t=1}^{w} (Z_{w-t})^{(-1)^{t-1} p_t},$$

where $p_t$ is a $t^{th}$ elementary symmetric polynomial in $x_1, x_2, \ldots, x_w$, and where $x_1, x_2, \ldots, x_w$ identify the sub-batch identifiers and, in turn, identify the invalid sub-batches of digital signatures.

16. The method of claim 9, further comprising the steps of:
k) setting N equal to the total number of digital signatures in all of the invalid sub-batches;
l) setting $Y_0$ equal to $Z_0$;
m) assigning a unique user-definable signature identifier to each digital signature in the invalid sub-batches;
n) computing values $Y_1$, for each value i from 1 to w−1, as a function of the digital messages, the digital signatures, the signer identifiers, and the signature identifiers in the invalid sub-batches;
o) computing $Y_w$ as a function of the digital messages, the digital signatures, the signer identifiers, and the signature identifiers in the invalid sub-batches;
p) searching for a multiplicative relationship amongst $Y_0, Y_1, \ldots, Y_w$; and
q) if a multiplicative relationship is found in step (p) then determining the invalid signatures from the multiplicative relationship and stopping, otherwise incrementing w and returning to step (o) for additional processing.

17. The method of claim 16, wherein the step of computing $Y_0$ as a function of the digital messages, the digital signatures, and the signer identifiers in a form appropriate for a pairing-based digital signature is comprised of the step of computing $$Y_0 = e\left(\sum_{k=1}^{N} B_k, P\right) e\left(\sum_{k=1}^{N} D_k, R\right),$$

where N is equal to the number of digital signatures in all of the invalid sub-batches, where $B_k = r_k G_k$, where $r_k$ is a user-definable random value, where $D_k = r_k H_k$, where $G_k$ and $H_k$ are values from a second group, where R and P are values from a third group.

18. The method of claim 16, wherein the step of computing $Y_i$ for each value i from 1 to w−1, as a function of the digital messages, the digital signatures, signer identifiers, and the signature identifiers is comprised of the step of computing $Y_i$ as a function of the digital messages, the digital signatures, the identifiers, and the signature identifiers in a form appropriate for a pairing-based digital signature, where $$Y_i = e\left(\sum_{k=1}^{N} (I_k)^i B_k, P\right) e\left(\sum_{k=1}^{N} (I_k)^i D_k, R\right),$$

where N is equal to the number of digital signatures in all of the invalid sub-batches, where $I_k$ is the signature identifier for the kth signature, where $B_k = r_k G_k$, where $r_k$ is a user-definable random value, where $D_k=r_k H_k$, where $G_k$ and $H_k$ are values from a second group, where R and P are values from a third group.

19. The method of claim 16, wherein the step of computing $Y_w$ as a function of the digital messages, the digital signatures, the signer identifiers, and the signature identifiers is comprised of the step of computing $Y_w$ as a function of the digital messages, the digital signatures, the signer identifiers, and the signature identifiers in a form appropriate for a pairing-based digital signature, where $$Y_w = e\left(\sum_{k=1}^{N}(I_k)^w B_k, P\right) e\left(\sum_{k=1}^{N}(I_k)^w D_k, R\right),$$

where N is equal to the number of digital signatures in all of the invalid sub-batches, where $I_k$ is the signature identifier for the kth signature, where $B_k=r_k G_k$, where $r_k$ is a user-definable random value, where $D_k=r_k H_k$, where $G_k$ and $H_k$ are values from a second group, where R and P are values from a third group.

20. The method of claim 16, wherein the step of searching for a multiplicative relationship amongst $Y_0, Y_1, \ldots Y_w$ is comprised of the step of searching for a multiplicative relationship concerning a pairing-based digital signature amongst $Y_0, Y^1, \ldots, Y_w$ where the multiplicative relationship is $$Y_w = \prod_{t=1}^{w}(Y_{w-t})^{(-1)^{t-1}p_t},$$

where $p_t$ is a $t^{th}$ elementary symmetric polynomial in $x_1, x_2, \ldots, x_w$, and where $x_1, x_2, \ldots, x_w$ identify the signature identifiers and, in turn, identify the invalid digital signatures.

21. A method of identifying invalid digital signatures involving batch verification, comprising the steps of:
 a) receiving on an electrical computer a plurality of corresponding digital messages, digital signatures, and signer identifiers;
 b) computing on the electrical computer a value $Z_1$ as a function of the received digital messages, the digital signatures, and the signer identifiers, where $Z_1$ is an element of a group, and where the group has an identity element;
 c) if $Z_1$ is equivalent to the identity element then determining on the electrical computer that the digital signatures, as a batch, are valid and stopping, otherwise proceeding to step (d);
 d) dividing once electrical computer the digital signatures into a first sub-batch and a second sub-batch;
 e) selecting on the electrical computer the first and second sub-batches;
 f) associating on the electrical computer $Z_1$ with the selected first and second sub-batches;
 g) computing on the electrical computer a value $Z_2$ as a function of the digital messages, the digital signatures, and the signer identifier in the first selected sub-batch;
 h) associating on the electrical computer $Z_2$ with the selected first and second sub-batches, where $Z_2$ is an element of a group, and where the group has an identity element;
 i) if $Z_2$ is equivalent to the identity element of the corresponding group then determining on the electrical computer that the selected first sub-batch is valid and the selected second sub-batch is invalid;
 j) if $Z_2$ is not equivalent to the identity element of the corresponding group but is equivalent to $Z_1$ associated with the selected first and second sub-batches then determining on the electrical computer that the selected first sub-batch is invalid and the selected second sub-batch is valid;
 k) if $Z_2$ is not equivalent to the identity element of the corresponding group and is not equivalent to $Z_1$ associated with the selected first and second sub-batches then determining on the electrical computer that the selected first and second sub-batch are invalid;
 l) if a selected sub-batch is determined to be invalid and the selected sub-batch contains only one digital signature then identifying on the electrical computer the digital signature as invalid;
 m) if the selected first sub-batch is determined to be invalid and contains more than one digital signature then
  (i) dividing on the electrical computer the selected first sub-batch into a third sub-batch of digital messages, digital signatures, and signer identifiers and an associated fourth sub-batch of digital messages, digital signatures, and signer identifiers;
  (ii) associating on the electrical computer, the third and fourth sub-batches resulting from step (i) with $Z_2$; and
  (iii) renaming on the electrical computer $Z_2$ as $Z_1$;
 n) if the selected second sub-batch is determined to be invalid and contains more than one digital signature then
  (i) dividing on the electrical computer the selected second sub-batch into a fifth sub-batch sub-batch of digital messages, digital signatures, and signer identifiers and a sixth sub-batch of digital messages, digital signatures, and signer identifiers;
  (ii) computing on the electrical computer a value $Z_3$ as the product of $Z_1$ and the inverse of $Z_2$;
  (iii) associating on the electrical computer the fifth and sixth sub-batches resulting from step (i) with $Z_3$; and
  (iv) renaming on the electrical computer $Z_3$ as $Z_1$; and
 o) if there is at least one pair of associated first and second sub-batches that have not been selected then selecting on the electrical computer one of such first and second sub-batches, and returning to step (g).

22. The method of claim 21, wherein the step of receiving a plurality of corresponding digital messages, digital signatures, and signer identifiers is comprised of the step of receiving a plurality of corresponding digital messages, digital signatures, and signer identifiers in a form appropriate for a digital signature format selected from the group of digital signature formats consisting of a pairing-based digital signature format, an elliptic curve-based digital signature format, and a digital signature format that employs finite field arithmetic.

23. The method of claim 21, wherein the step of determining if $Z_1$ is equivalent to the identity element is comprised of the step of determining if $Z_1$ is congruent to 1.

24. The method of claim 21, wherein the step of determining if $Z_2$ is equivalent to the identity element is comprised of the step of determining if $Z_2$ is congruent to 1.

* * * * *